INVENTOR.
GEORGE de SOCIO
BY
S. A. Strickland
ATTORNEYS

Jan. 8, 1963 G. DE SOCIO 3,072,848

BROADBAND JAMMER UTILIZING A DUPLEX POWER DISTRIBUTED AMPLIFIER

Filed Feb. 3, 1959 2 Sheets-Sheet 2

INVENTOR.
GEORGE DE SOCIO

BY

S. A. Stricklett
ATTORNEYS

United States Patent Office 3,072,848

Patented Jan. 8, 1963

3,072,848

BROADBAND JAMMER UTILIZING A DUPLEX POWER DISTRIBUTED AMPLIFIER

George de Socio, Baltimore, Md., assignor to the United States of America as represented by the Secretary of the Air Force Filed Feb. 3, 1959, Ser. No. 790,986
3 Claims. (Cl. 325—132)

The present invention relates to a duplex power supply and particularly to a broad band jammer fed by a duplex distributed amplifier power.

The principles of distributed amplification including a description of the basic theory of operation of such systems, was presented by Percival in British Patent 460,562, dated July 15, 1936, and discussed in the article entitled "Distributed Amplification" appearing in the Proceedings of the I.R.E., vol. 36, page 956 (1948), by Ginston, Hewlett, Jasberg and Noe.

In conventional amplifiers, where the tubes are connected in cascade, the total voltage gain is the product of the gains of each individual tube. Since the product of gain and band width has an upper limit for any given tube, the gain per tube must be reduced in order to increase the band width. Connecting the tubes in parallel does not improve the condition because the circuit capacity, which limits the band width, is approximately doubled by the parallel grid-cathode interelectrode capacities.

According to the principles of distributed amplification, a number of tubes are arranged so that the individual tubes are driven, not at the same time, but in sequence by an input signal, with their outputs being delayed and then added. In this arrangement the grid to ground capacities of the tubes form the capacitive elements of a lumped constant delay line and coils connected consecutively between the grids form the inductive elements. The plates are connected to another delay line with the same propagation constant.

As a signal travels down the grid line it causes a wave to propagate in both directions at each successive plate. The waves in the forward direction add in phase and are applied to a load and those in the reverse direction are absorbed in terminating resistors. The total gain is the sum of the gains of individual tubes.

The heretofore known distributed amplifiers have been effective in wide band amplication but have been inefficient because of the loss of power in the reverse terminations.

The present invention improves the efficiency of broad band distributed amplifiers by feeding a load at both the forward and reverse terminations of the plate line. This is of particular value where two loads must be fed simultaneously in the same phase relation. By applying the input voltage at the center of the grid line a voltage will be propagated in both directions. If the two halves of the amplifier are alike the reverse and forward loads will be equal and in phase.

In the use of jamming it is desirable to cover a maximum of area with a wide band in order to prevent questing radars from securing a fix. By mounting a pair of antennas so that they do not "see" each other and by feeding the pair of antennas with the wide band power produced by a duplex distributed amplifier a maximum of coverage in area and band width can be secured.

In the construction according to the present invention a pair of radiating antennas are mounted on the opposite sides of a supporting vehicle and connected to the respective ends of the plate line of a broad band distributed amplifier by equal lengths of supply cable and an input voltage connection is applied centrally of the grid line.

It is accordingly an object of the invention to provide an improved jamming system.

It is another object of the invention to provide a distributed amplifier having an improved efficiency.

Other objects and advantages of the invention will be apparent from the following description taken in conjunction with the accompanying drawing in which.

Figures 1, 2, 3, 4:
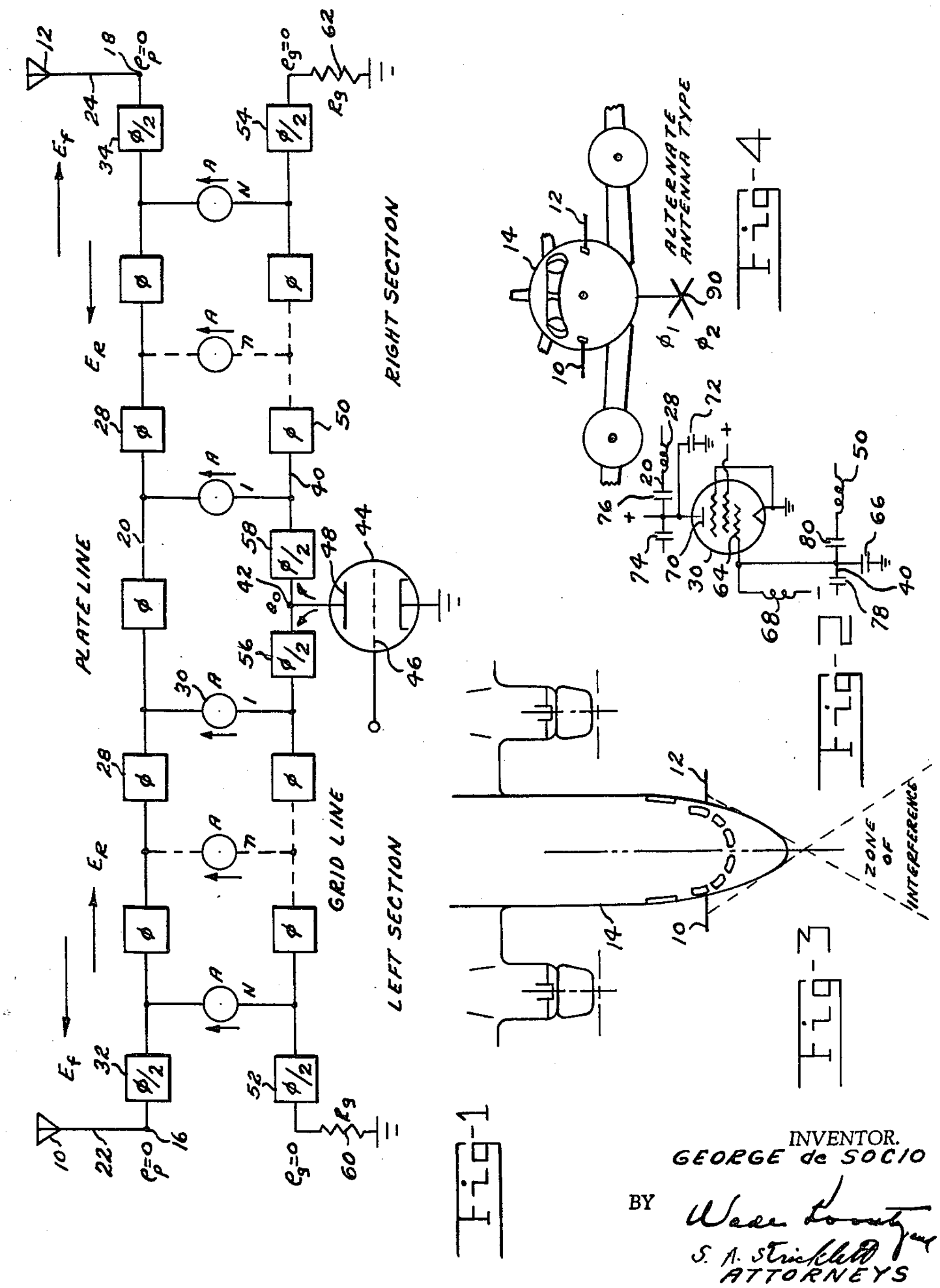
FIG. 1 is a schematic diagram of a broad band jammer having a duplex distributed amplifier.
FIG. 2 is a possible wiring diagram for the amplifier sections.
FIG. 3 is a fragmentary schematic diagram showing the manner of mounting the jammer on a vehicle.
FIG. 4 is a fragmentary view of a modification.
Figure 5:
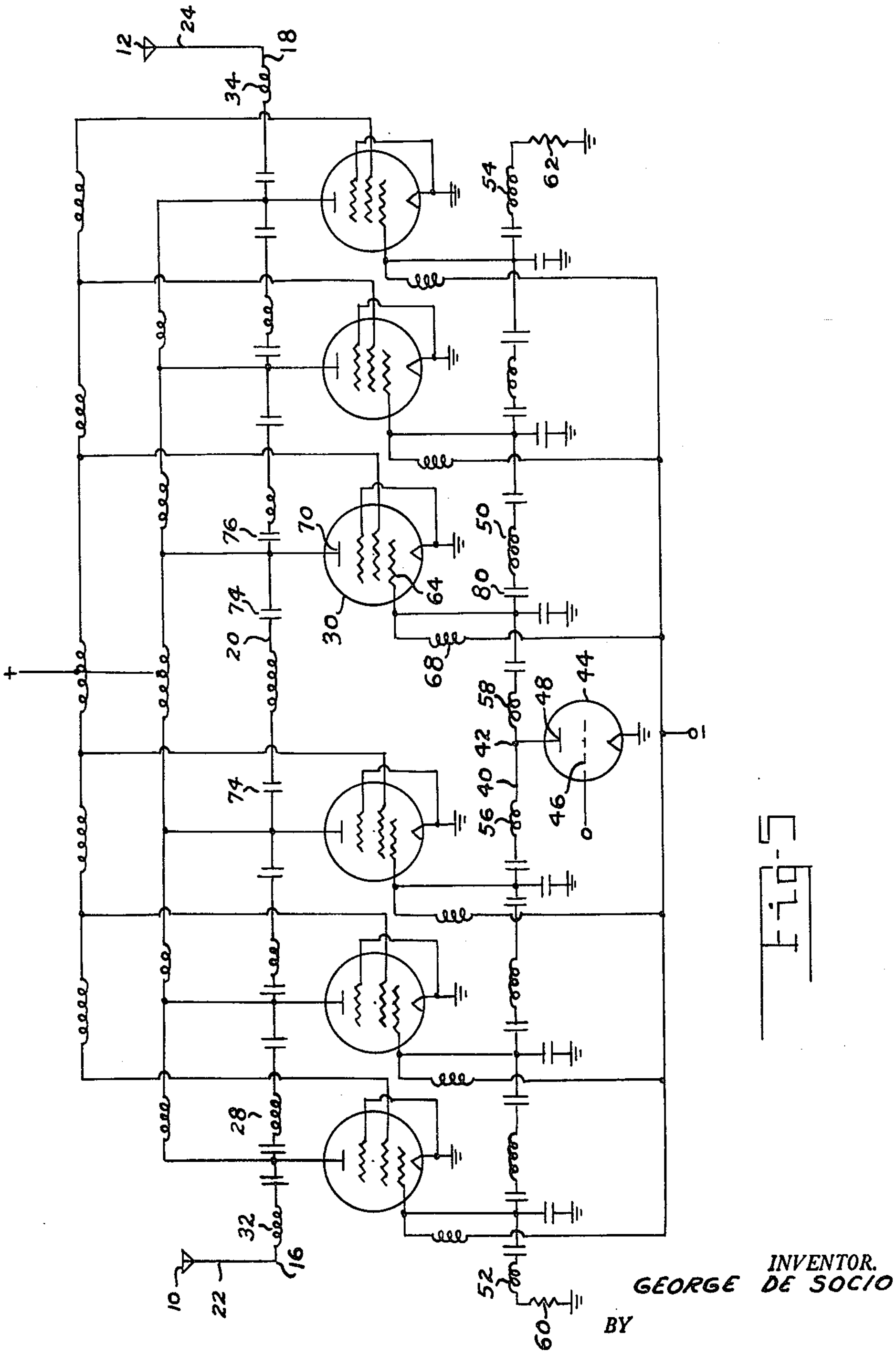
FIG. 5 is a wiring diagram of the system shown in FIG. 1.

In an exemplary embodiment according to the invention antennas 10 and 12 are mounted in substantially hidden relation with respect to each other on the body of a vehicle such as the airframe 14 of an aircraft. Antennas 10 and 12 are connected to respective ends 16 and 18 of a plate line 20 of a distributed amplifier presently to be described. The antennas 10 and 12 are connected by substantially identical cables 22 and 24.

The distributed amplifier as is well known is constituted by a plurality of amplifier tubes connected in spaced relation to a delay line having suitable reactors 28 connected between each of the tubes 30 and its adjacent tube with a final termination at each end and reactors 32 and 34 having one-half of the reactance of the reactors 28. The tubes 30 are distributed in a right and left section each containing one-half of the number of tubes in the amplifier. The amplifier tubes 30 are controlled from a grid line 40 having a connection 42 intermediate the ends thereof for applying control impulses to the grid line. Herein the connection is shown as the tube 44 having a controlled grid 46 to which the control impulses are applied. The current to the plate 48 will be drawn from the grid line 40 and the impulse will be propagated in each direction up the grid line 40 with the capacitance to ground of the grids of the tube 30 forming lump capacitance of a delay line and reactors 50 forming lumped reactance so that the delay characteristics of the grid line 40 and the plate line 20 are identical. The grid line is terminated by reactors 52 and 54 having one-half the reactance of the intermediate reactors 50. Also, reactors 56 and 58 at the connection 42 are likewise of one-half the reactors of the intermediate reactors 50. The reverse and forward ends of the grid line 40 are terminated to ground by means of impedances 60 and 62.

While the individual units of the distributed amplifier may be constructed of any of the well known filter units the connection shown in FIG. 2 has been found satisfactory. The tube 30 is provided with a control grid 64 connected to ground through a capacitor 66 and biased from a suitable negative source through an impedance 68. The plate 70 is connected to ground through a capacitor 72 and supplied with positive potential from any suitable source. The plate is connected to the plate line 20 and the positive D.C. potential is blocked from the plate line 20 by means of suitable blocking capacitors 74 and 76. The grid line 40 likewise contains blocking capacitors 78 and 80.

For the analysis of the duplex amplifier, the following are good assumptions: (1) the lines are lossless, (2) amplifiers are linear and are current generators, (3) no reflections exist at the terminals of the transmission lines, (4) lines are constant K filters with identical propagation constants or phase shifts, (5) no interaction between grid and plate lines.

Consider an input voltage wave $e_0$ at 42 propagating in both directions along grid line 40, voltages appearing at each amplifier tube are delayed in proportion to the number of phase shift sections traversed. For our analysis we will consider only the voltage wave appearing at the plates 70 of each amplifier tube 30. These voltages combine with both the forward wave and the reverse wave. We shall combine these waves to show the nature of the output into the antennas 10 and 12.

Let $E_f$=forward wave for its own section
Let $E_r$=reverse wave for its own section
Let $A$=gain of each section $$=e_{in}\frac{G_m Z_{0p}}{2}$$

$\phi$=phase shift for each full section
$\phi/_2$=phase shift for each half section
$e_0$=input voltage to grid line
$N$=number of amplifiers per section=½ total tubes in amplifier The voltage wave existing at the antenna at the left due to the forward wave of the left section:

$$E_f=Ae_0^{jN\phi}$$

The voltage wave existing at the left antenna due to the reverse wave from the right section is:

$$E_R=Ae_0[e^{j\phi(N+1)}+e^{j\phi(N+3)}+\ldots e^{j\phi(3N-1)}]$$

$$=Ae_0\sum_{n=1}^{N}e^{j\phi(N+2n-1)}$$

$$=Ae_0e^{j\phi(N-1)}\sum_{n=1}^{N}e^{j2n\phi}$$

$$E_R=Ae_0e^{j\phi(N-1)}[e^{j2\phi}(1+e^{j2\phi})+\ldots e^{j2\phi(N-1)}]$$

$$=Ae_0e^{j\phi(N-1)}\frac{e^{j2N\phi}-1}{e^{j2\phi}-1}$$

which reduces to $$E_R=Ae_0e^{j2N\phi}\frac{\sin N\phi}{\sin\phi}$$

adding $E_f+E_R=E_t$ the total voltage at the left antenna.

$$E_t=Ae_0Ne^{jN\phi}+Ae_0e^{j2N\phi}\frac{\sin N\phi}{\sin\phi}$$

$$=Ae_0Ne^{jN\phi}\left[1+e^{jN\phi}\frac{\sin N\phi}{N\sin\phi}\right]$$

normalizing $E_t$ and taking magnitude $$E_{tn}=\left|\frac{E_t}{ANe_0e^{jN\phi}}\right|=\sqrt{1+\frac{\sin 2N\phi}{N\sin\phi}+\left(\frac{\sin N\phi}{N\sin\phi}\right)^2}$$

derives the expression for the magnitude of the voltage existing at the antenna.

Due to symmetry, this voltage exists at the right antenna also. The above voltage is due to the parallel feed of the grid line. However, if a balanced input to the grid line is available, a slight modification results due to the fact that $E_R=-E_R$ for the parallel case.

The normalized magnitude of $E_t$ for balanced input is then:

$$E_{tn}=\sqrt{1+\frac{\sin 2N\phi}{N\sin\phi}-\left(\frac{\sin N\phi}{N\sin\phi}\right)^2}$$

It is evident that for a balanced input, the signals at the antenna are opposite in phase, and could be used for a push-pull power output.

The magnitude of the voltages existing at the antennas is not constant with frequency and slight cancellation and reinforcement due to the reverse waves produce a gain tolerance in the band. The approximate shrinkage for each type amplifier is as follows:

TABLE I

| N | $f_1$,[a] 3 db, percent | $f_2$,[b] 3 db, percent | Percent coverage |
|---|---|---|---|
| 3 | 14 | 92 | 78 |
| 4 | 10 | 92 | 82 |
| 5 | 7 | 95 | 88 |
| 6 | 6 | 96 | 90 |

[a] There is a gain below $f_1$ for parallel feed, and a loss for balanced feed.
[b] There is a loss below $f_2$ for parallel feed, and a gain for balanced feed.

In general, the low frequency rise in gain is not particularly serious in a distributed amplifier, and as noted above in Table I, the high frequency cutoff is reduced only slightly above 4 tubes.

In actual cases where some line attenuation is present, the reverse waves are attenuated more than the forward waves and will thereby reduce the gain tolerance in the band. The reverse waves on the line cancel each other at all points on the line for a parallel input.

If the antennas 10 and 12 are not completely isolated from each other, a disturbance will exist on the plate line depending upon coupling and phase shift between the antennas.

The voltage gain of the amplifier section is roughly halved, but the total power delivered to both antennas is increased over an ordinary distributed amplifier, if the driving voltage $e_0$ remained constant.

Effects on performance of this amplifier due to mismatches at the termination are no different than that for an ordinary distributed amplifier.

As indicated above, the mutual coupling between the antennas 10 and 12 affects not only the pattern, but the driving impedance of the antennas. The amount of coupling will determine the amount of signal fed from one antenna to the other. The energy fed back into the antenna will propagate eventually in a reverse direction on the plate line 20 of the distributed amplifier. This will produce the same effect as a mismatched load. If we consider that the mismatches are identical, then the reverse traveling waves will be equal and opposite in phase and there will be as a result standing waves on the plate line 20. The two waves will cancel in the center of the line and partially cancel elsewhere. Standing waves on the plate line will not affect the performance of the amplifier. It should be mentioned here that each antenna is connected through equal length cables.

The other factor to be considered, of course, is the antenna pattern. There are a few interesting possibilities for antenna arrangement as applied to jamming. Since it is desired to cover as much space as possible, particularly forward and below and to the sides, two antennas mounted on a large airframe will cover about twice as much space as one. If the two antennas cannot "see" each other, there will be small pattern interference forward. If the antennas are mounted horizontally and symmetrically opposite at the nose of the aircraft, the patterns could be just touching at the frame center of the aircraft and a null will occur there. This is not objectionable since we are not usually aimed directly at the antenna of the receiver to be jammed. If slight overlapping of the patterns occur, multiple lobes will appear at the forward line. Such an installation is shown in FIG. 3; although each antenna does not "see" the other, there is a zone of interference forward, and depending upon the contour of the ship, the antennas can be placed to minimize this zone.

Another type of antenna which could be fed by such an amplifier could be an omnidirectional antenna 90 with crossed polarization as shown in FIG. 4 where coupling between phases is minimized. Such an antenna mounted below the aircraft would give full coverage with elliptical polarization.

Another possibility for application of this amplifier is to push-pull oscillography in which the phases are inverted by a balanced input. Here the plate lines are open and twice the gain will be realized.

It appears that for a broadband power amplifier, a duplex distributed amplifier will make a more efficient amplifier from the standpoint of power output and a broader space coverage for an aircraft jammer installation. It must be noted, however, that the only power gained is that originally lost in the reverse termination; the overall efficiency is thereby increased.

For purpose of exemplification a particular embodiment of the invention has been shown and described according to the best present understanding thereof. However, it will be apparent to those skilled in the art that various changes and modifications in the construction and arrangement of the component parts thereof can be resorted to without departing from the true spirit and scope of the invention.

I claim:

1. A broadband jammer comprising a pair of spaced apart antennas substantially shielded from each other, a duplex power amplifier constituted by a distributed amplifier including a plate line, the opposite ends of said plate line being connected to the respective antennas, a grid line and a voltage wave input in the center of said grid line.

2. A broadband jammer comprising a pair of antennas substantially shielded from each other, a broadband distributed amplifier connected between said antennas, said amplifier including a plate line having the opposite ends connected to the respective antennas, a grid line and a voltage input connection centrally of said grid line.

3. A distributed amplifier including a plurality of pairs of current generator tubes, a plate delay line connected to the plates of said tubes, a load connection at each end of said line, a grid delay line, an input voltage connection centrally of said grid line for propagating a voltage simultaneously in opposite directions in said amplifier.

References Cited in the file of this patent

UNITED STATES PATENTS

| | | |
|---|---|---|
| 2,530,142 | Atkins | Nov. 14, 1950 |
| 2,593,948 | Weigand | Apr. 22, 1952 |
| 2,658,992 | Byrne | Nov. 10, 1953 |
| 2,863,007 | Fischer | Dec. 2, 1958 |
| 2,885,543 | Williams | May 5, 1959 |
| 2,960,664 | Brodwin | Nov. 15, 1960 |

FOREIGN PATENTS

| | | |
|---|---|---|
| 739,954 | Great Britain | Nov. 2, 1955 |
| 954,073 | Germany | Dec. 13, 1956 |